May 5, 1970 G. R. COGAR 3,510,680
ASYNCHRONOUS SHIFT REGISTER WITH DATA CONTROL GATING THEREFOR
Filed June 28, 1967
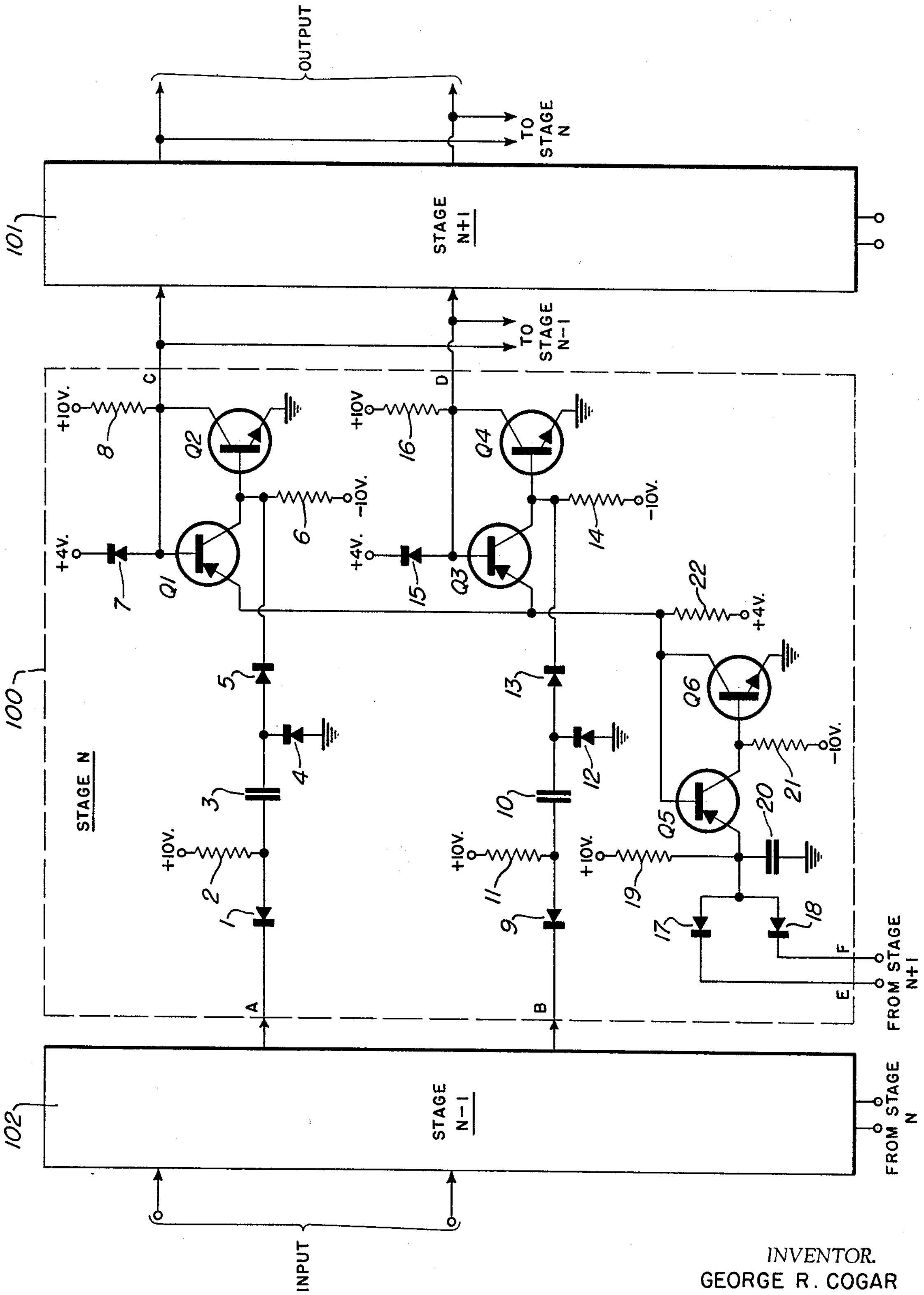
INVENTOR.
GEORGE R. COGAR
BY G. Donald Weber, Jr.
ATTORNEY.

United States Patent Office 3,510,680

Patented May 5, 1970

3,510,680

ASYNCHRONOUS SHIFT REGISTER WITH DATA CONTROL GATING THEREFOR

George R. Cogar, Frankfort, N.Y., assignor to Mohawk Data Sciences Corp., East Herkimer, N.Y., a corporation of New York Filed June 28, 1967, Ser. No. 649,707
Int. Cl. H03k *23/30, 21/30*
U.S. Cl. 307—221 4 Claims

ABSTRACT OF THE DISCLOSURE

An asynchronous shift register, each stage of which has binary inputs and outputs. In each stage associated inputs and outputs are contained within a signal channel and information supplied to each channel is stored by a pair of interconnected transistors which form a latching network. The interconnected transistors are controlled by a condition feedback network which is responsive to the state of the next successive stage of the register, whereby data applied to the input of the register is automatically shifted into a que at the output end of the register.

In the electronic industry, in general, and the data processing art in particular, many types of registers, more specifically, shift registers, are well known. To a large degree, shift registers, as known, are of so-called synchronous type. That is, information is stored in the several stages and is switched or shifted thereby only upon the application of a "shift signal." Generally, this shift signal is related to a clock signal whereby a synchronous type of operation occurs. As is known, the synchronous type of operation is frequently somewhat slower compared to the operation of a machine or system in which the register is utilized. That is, synchronous operation is geared to the slowest operation in the machine since this "worst-case" condition must be capable of being fulfilled. Consequently, the asynchronous type of operation has been used to improve speed characteristics. In asynchronous operation, the circuit is ready to operate as soon as the input signals are applied. Periodic operation is not used and the inherent slowness is avoided.

The field of this invention and the prior art is best exemplified by U.S. Pat. 2,922,985 by D. J. Crawford and by U.S. Pat. 3,166,715 by G. Cogar. This prior art shows, generally asynchronous circuits and the operation thereof. However, as will become evident by a comparison, the subject invention is significantly different in concept, as well as in configuration, from the noted prior art.

Generally, this invention relates to a queing register and, more particularly, to the operation of a single stage thereof. The register is comprised of the subject circuit, which is shown in modular form, and which provides a single stage of the register. A register which is constructed from a plurality of modular stages may consist of any number of individual stages. The stages can be interconnected serially such that data inputs applied to a low order stage will automatically que towards a high order stage. Additionally, as a data bit is removed from a high order stage, all residual data contained in the register will queue toward the high order stage which has been evacuated or rendered EMPTY. As noted since the design is modular there is no limit to the length of the register in the serial cascade configuration. Moreover, the width of the stage may be increased (within the practical limits of the components) to handle binary, decimal, or similar types of signals. In the embodiment disclosed, the stage is capable of handling binary data and may be classified as a ternary element in that it is capable of assuming three states, namely "1," "0" and EMPTY.

Consequently, it is an object of this invention to provide an asynchronous circuit.

Another object of this invention is to provide an asynchronous queing register comprised of a number of circuits which operate asynchronously.

Another object of this invention is to provide a relatively simple asynchronous queing register stage which is modular in design.

These and other objects and advantages of this invention will become more readily apparent when the following description is read in conjunction with the attached drawing in which:

A queing register is depicted with a detailed showing of one stage thereof.

Referring now to the drawing, there is shown an electronic register having three stages. The number of stages is chosen arbitrarily and is not limitative of the invention. Stages 101 and 102 are substantially identical to stage 100 which is shown in detail. The outputs from the low order stage 102 (stage $N-1$) are applied to terminals A and B of stage 100 (stage N). The outputs from stage 100 are applied to the next higher order stage via terminals C and D. These outputs are received by terminals similar to terminals A and B of stage 100. In addition, output terminals C and D are connected to control terminals of stage 102 and provide a condition feedback network. Control terminals E and F of stage 100 are connected to the output terminals of stage 101 in a similar manner and provide a condition feedback network. Thus, input signals are supplied from stage 102 to stage 100 at terminals A or B. Terminals C and D of stage 100 are utilized to supply input signals to stage 101 as well as to the condition feedback network of stage 102. The control terminals E and F are connected to the output of stage 101.

It should be noted, that the input terminals A and B are suggested inasmuch as the embodiment described is utilized for a binary operation. If decimal type information is desired, additional input terminals will be required as well as additional horizontal channels associated therewith. However, for purposes of clarity and brevity, only binary operation is described. This description is not to be limitative of the invention.

Terminals A and B are designated as the input signals. For binary operation, one of these terminals, for example terminal A, will receive signals indicative of a binary "one" being generated by stage 102. The other of the input terminals, for example terminal B, will receive signals indicative of a binary "zero" being generated by stage 102. These input signals will, typically, have the same polarity. Thus, the horizontal channels may be identical. Since the channels are identical, it is immaterial as to which channel is the "one" channel and which is the "zero" channel. However, consistency throughout the register is desirable.

In the preferred embodiment shown in the figure, input terminal A (of a first channel) is connected to the cathode of diode 1. The anode of diode 1 is connected to a suitable potential source via resistor 2. In the preferred embodiment, this potential source supplies a potential of +10 volts. The anode of diode 1 is further connected to the cathode of diode 4 via capacitor 3. The anode of clamping diode 4 is connected to a suitable reference potential, for example ground. The cathode of diode 4 is further connected to the anode of coupling diode 5 which has the cathode thereof connected to a suitable potential source via resistor 6. In the preferred embodiment, this potential source supplies a potential of −10 volt. Also connected to the junction between the cathode of diode 5 and resistor 6 is the base electrode of transistor Q2.

Typically, transistor Q2 is an NPN transistor having the emitter thereof connected to ground. The collector of transistor Q2 is connected to a suitable potential source via resistor 8. This potential source may typically provide a potential of +10 volts. The collector of transistor Q2 is also connected to output terminal C.

A PNP transistor Q1 has the collector electrode thereof connected to the base electrode of transistor Q2. The base of transistor Q1 is connected to the collector of transistor Q2. Additionally, the base of transistor Q1 is connected to the anode of diode 7 which has the cathode thereof connected to a suitable potential source. Typically, this source provides a potential of +4 volts. The emitter electrode of transistor Q1 is connected to a potential source via resistor 22. This potential source typically supplies +4 volts.

In a second channel, input terminal B is connected to the cathode of diode 9 which has the anode thereof connected to a +10 volt potential source via resistor 11. The anode of diode 9 is connected to the cathode of clamping diode 12 via coupling capacitor 10. Clamping diode 12 has the anode thereof connected to ground or other suitable reference potential. The cathode of diode 12 is connected to the anode of diode 13. The cathode of diode 13 is connected to a —10 volt potential source via resistor 14.

Transistor Q4 which is an NPN transistor, similar to transistor Q2, has the base thereof connected to the junction of the cathode of diode 13 and resistor 14. The emitter of transistor Q4 is connected to ground. The collector of transistor Q4 is connected to a +10 volt potential source via resistor 16. Additionally, the collector of transistor Q4 is connected to an output terminal D.

Transistor Q3 has the base thereof connected to the collector of transistor Q4. The collector of transistor Q3 is connected to the base of transistor Q4. The base of transistor Q3 is connected to the anode of diode 15 which has the cathode thereof connected to a +4 volt potential source. The emitter of transistor Q3 is connected to the emitter of transistor Q1 and to the +4 volt potential source via resistor 22.

The condition feedback network has control inputs E and F. Input terminal E is connected to the cathode of diode 17 while input terminal F is connected to the cathode of diode 18. The anodes of diodes 17 and 18 are connected together and to a +10 volt potential source via resistor 19. Additionally, the anodes of diodes 17 and 18 are connected to a suitable reference potential, for example ground, via capacitor 20. The emitter of PNP transistor Q5 is connected to the common junction of the anodes of the diodes 17 and 18. The collector electrode of transistor Q5 is connected to a —10 volt potential source via resistor 21. Furthermore, the collector of transistor Q5 is connected to the base of NPN transistor Q6. The emitter electrode of transistor Q6 is connected to a suitable potential source for example ground. The base of transistor Q5 is connected to the collector of transistor Q6 and to the emitters of transistors Q1 and Q3 which are jointly connected to a +4 volt potential source via resistor 22.

In describing the operation of the circuit, reference will be made to the drawing. As noted, the circuit can have three states namely "1," "0" or EMPTY. Assuming initially, that stage 100 is in the EMPTY state, transistors Q1, Q2, Q3 and Q4 are nonconductive. With these transistors nonconductive, a potential of +4.7 volts appears at output terminals C and D. That is, the network comprising the +10 volt and the +4 volt sources connected by the series network comprising the diode 7 (or 15) and the resistor 8 (or 16) causes +4.7 volts (i.e. the +4 volt source plus the voltage drop across diode 7 or 15) at the output terminals C and D.

It will be seen that the output potential at terminals C and D is relatively independent of the operating state of transistor Q6. That is, if transistor Q6 is turned on and is conductive, the collector electrode thereof is at or near ground potential. This potential is supplied to the emitter electrode of transistors Q1 and Q3. However, the bases of these transistors can never be driven more negative than ground potential. Therefore, transistors Q1 and Q3 cannot be turned on. In the case where transistor Q6 is not conducting, the maximum potential which can be supplied to the emitters of transistors Q1 and Q3 would be somewhat less than +4 volts which is less than the potential normally applied at the base of the transistor. Transistors Q1 and Q3 can only be rendered conductive in this condition with the application of an input signal, as will be described hereinafter.

The state of transistors Q5 and Q6 is dependent upon the state of the succeeding or high order stage. That is, the feedback or control signals supplied by stage 101 are applied to terminals E and F of stage 100. If these signals are high level signals, i.e. indicative of the EMPTY state of stage 101, diodes 17 and 18 are reverse biased. Capacitor 20 will be charged toward +10 volts by the potential source via resistor 19. This potential is sufficient to forward bias transistor Q5 and render same conductive regardless of the potential supplied at the base thereof by the circuit. That is, the maximum potential at the base of transistor Q5 is +4 volts.

When transistor Q5 is turned on, the positive potential at the emitter thereof is supplied to the base of transistor Q6. This positive potential is sufficient to turn on NPN transistor Q6 such that conduction thereby is established. Conduction by transistor Q6 effectively clamps the collector thereof at about ground potential. As noted, this condition also clamps the emitters of transistors Q1 and Q3 at or about ground potential. Transistors Q1 and Q3 can never be driven into conduction under these conditions. That is, the minimum potential which can be applied to the base of transistor Q1 or Q3 is about ground potential. Consequently, a positive step function occurring at either of the input terminals A or B can only affect the state of transistors Q2 or Q4. Under the existing conditions, the effect produced at transistor Q2 or Q4 is only transistory and is removed when the associated capacitor 3 (or 10) is charged.

More particularly, a positive-going step function at the input terminal A reverse biases diode 1 whereby capacitor 3 is charged by the +10 volt source via resistor 2. The signal produced across capacitor 3 is, initially, coupled via diode 5 to the base of transistor Q2. This signal is sufficiently positive to render transistor Q2 conductive whereby the collector electrode thereof exhibits substantially ground potential. However, as soon as the input signal is removed, or capacitor 3 is charged, the circuit relaxes and produces a +4.7 volt output.

As will appear hereinafter, the time constant of resistor 2 and capacitor 3 (or resistor 11 and capacitor 10) is less than the time constant of the network comprising resistor 19 and capacitor 20. Thus, a signal from a low order stage such as stage 102 can be transferred directly to a high order EMPTY stage such as stage 101 via any intermediate EMPTY stage such as stage 100. Consequently, asynchronous operation of the circuit permits high speed operation. For example, an input signal can be transmitted through all of the EMPTY stages in a register until stored in the last EMPTY stage. That is, as soon as a succeeding stage is empty, a preceding stage can transfer a signal. The transfer limitation is a function of the width of the transfer pulse. For example 10 msec. would be required to transfer a 1.0 msec. pulse through ten stages. In the synchronous type of circuit, the input signal would be transmitted through the register stage-by-stage only upon the application of periodic clock pulses regardless of any succeeding EMPTY stages. Since in asynchronous operation the input signal is transmitted through the EMPTY stages, as soon as fully transferred, it is not stored therein (except the last EMPTY stage in the register) whereby the unused EMPTY stage remains EMPTY and receptive to information for storage therein of further signals.

Consider now the situation wherein stage 100 is EMPTY and the succeeding or high order stage contains a binary bit, either a "1" or a "0." A low or ground potential output signal is produced at one of the output terminals of the high order stage. This ground or negative signal is applied to one of the control terminals E or F of stage 100. This signal forward biases the associated coupling diode 17 or 18. When either diode 17 or 18 is rendered conductive, the current supplied via resistor 19 is diverted from capacitor 20 through the conductive diode. Additionally, capacitor 20 will be discharged through the conductive diode whereby the potential at the emitter of transistor Q5 becomes substantially ground. The potential difference between the base and emitter electrodes of transistor Q5 is insufficient to maintain conduction thereof. When transistor Q5 becomes nonconductive, the −10 volt source is connected to the base of transistor Q6 via resistor 21. This negative potential is sufficient to render transistor Q6 nonconductive wherein the potential at the emitter electrode of transistors Q1 and Q3 rises to +4 volts. Since the potential at the base of transistors Q1 and Q3 is +4.7 volts, these transistors remain nonconductive.

If now, a positive step function signal is applied at either terminal A or terminal B, the respective transistors Q2 or Q4 will be driven to conduction. That is diode 9, for example, is reverse biased whereby capacitor 10 is charged by the +10 volt source. When either of the transistors Q2 or Q4 is rendered conductive, the collector electrode thereof exhibits substantially ground potential. This operation is described supra. However, the ground potential at the collector of transistors Q2 or Q4 is now applied at the base of transistor Q1 or Q3 respectively. This potential reverse biases the respective diode in the base circuit and biases the respective transistor into conduction inasmuch as the emitter thereof is connected to substantially +4 volts. When transistor Q1 or Q3 is rendered conductive, a +4 volt signal is supplied to the base of the respective NPN transistor associated therewith. The positive signal at the base thereof maintains the NPN transistor conductive. When the NPN transistor is maintained conductive, ground potential is supplied to the base of the PNP transistor. This potential is sufficient to maintain the PNP transistor in the conductive state. Thus, the transistor pairs comprising transistors Q1 and Q2 or Q3 and Q4, when rendered conductive, tend to latch one another into a stable conductive condition. Consequently, stage 100 has now stored the appropriate signal which was applied at its input terminal.

This stable conductive condition causes the ground potential signal to be supplied at the respective output terminal C or D. The output signal is, thus, applied for a sufficient duration to fully discharge the storage capacitor (similar to capacitor 20) in the low order stage as well as to drive the high order state. The discharge of the storage capacitor conditionally renders the low order stage receptive to input signals which can be stored therein. Moreover, this conductive condition indicates that stage N has stored a bit therein and will not receive another input signal.

In another case, both the high order stage (stage $N+1$) and the low order stage (stage N) contain a bit in the form of either a binary "1" or binary "0". Thus, at least one output of each stage is a ground potential signal. When the high order stage is changed to the EMPTY state, the output signals C and D supplied by the high order stage will both switch to the +4.7 volt level. These signals will be applied to the cathodes of diodes 17 and 18 and render same nonconductive. After a time period, which is established by the RC time constant of resistor 19 and capacitor 20, transistors Q5 and Q6 will be rendered conductive as noted supra. As noted, this time constant is longer than the time constant for the RC networks in the drive channels. Thereby spurious feedthrough is avoided.

The conductive condition of transistor Q5 will cause the collector electrode of transistor Q6 to exhibit substantially ground potential. The conduction of Q6, thus, diverts the current from resistor 22. Diverting the current from resistor 22 causes the emitter electrodes of the transistors Q1 and Q3 to have substantially ground potential supplied thereto whereby transistors Q1 and Q3 are rendered nonconductive. When transistors Q1 and Q3 are rendered nonconductive, transistors Q2 and Q4 are also rendered nonconductive. When transistors Q2 and Q4 are rendered nonconductive, the potential exhibited at the collector electrodes thereof switches to the positive voltage +4.7 volts. This high level signal is then transferred to the high order stage (stage $N+1$) which had previously switched to the EMPTY condition and the high level signal is now stored therein. That is, the leading edge of the positive step function is transferred via a coupling capacitor (similar to capacitors 3 and 10) to the output transistor.

There has been described a preferred embodiment of the invention. It is to be understood that modifications may be made in the circuit shown and described. However, any and all modifications which are within the inventive concepts are intended to be included in the scope of the invention.

The embodiments of the invention in which an exclusive property or privilege is claimed are defined as follows:

1. An asynchronous shift register comprising:

(a) at least one signal channel, said signal channel comprising input means and output means;

(b) storage means connected to said signal channel to receive information supplied by said input means; and (c) control means connected to said storage means for controlling the ability to receive information supplied thereto, said control means including gate means, said gate means producing signals in response to the signals applied thereto, source means, and semiconductor means, said semiconductor means connected to said gate means to receive signals therefrom, said semiconductor means connected to said source means to selectively short circuit said source means in response to signals supplied to said gate means.

2. The asynchronous shift register as recited in claim 1 wherein said semiconductor means includes a pair of opposite conductivity type transistors, one of said transistors being connected to said storage means to provide a control signal thereto in accordance with the signals supplied to said gate means.

3. An asynchronous binary data shift register having a plurality of stages, each stage having an input and an output, said stages being serially interconnected between the input and output ends of said register, each said stage comprising:

a signal transfer circuit connected between the input and the output of the stage, said circuit operating, when in a first state, to generate at said stage output a predetermined duration bidirectional voltage transition in response to a voltage transition at said stage input and, when in a second state, to generate a unidirectional transition in response to a transition at said stage input; and a control circuit operable in response to the voltage level present at the output of the next succeeding stage of said register to determine the state of said signal transfer circuit, said control circuit including an integrating network for inhibiting the switching of said transfer circuit from said first state to said second state until said output from said next succeeding stage has remained stable for a period longer than said predetermined duration.

4. The asynchronous shift register set forth in claim 3 wherein each said stage further comprises:

a second signal transfer circuit having an input and an output for providing a second binary data channel;

means for connecting said control circuit to be operable in response to the voltage level present at either output of the next succeeding stage; and means for connecting said second signal transfer circuit to said control circuit whereby the latter controls both said signal transfer circuits of the stage in an identical manner.

References Cited

UNITED STATES PATENTS

| | | | |
|---|---|---|---|
| 2,781,447 | 2/1957 | Lester | 328—37 |
| 3,166,715 | 1/1965 | Cogar | 328—37 |
| 3,268,740 | 8/1966 | Rywak | 307—221 |
| Re. 26,082 | 9/1966 | Osborne | 307—221 |
| 3,421,092 | 1/1969 | Bower et al. | 328—37 |

JOHN S. HEYMAN, Primary Examiner

U.S. Cl. X.R.

307—247; 328—37